United States Patent Office 3,770,794
Patented Nov. 6, 1973

3,770,794
DIALKYLADAMANTANE DINITRILE
Robert M. Thompson, Chalfonte, Wilmington, Del., assignor to Sun Research and Development Co., Philadelphia, Pa.
No Drawing. Filed Oct. 22, 1971, Ser. No. 191,827
Int. Cl. C07c 121/46
U.S. Cl. 260—464                             2 Claims

ABSTRACT OF THE DISCLOSURE

This invention relates to a dialkyladamantane dinitrile; namely, 1,3-dimethyladamantane-5,7-dinitrile, and to the preparation of it and its homologues from a dialkyladamantane diacid. The preparation starts with the chlorination of the dialkyladamantane diacid which is followed by the amidation of the resulting diacid chloride and ends with the dehydration of the resulting diamide. The named dinitrile has the following structural formula:

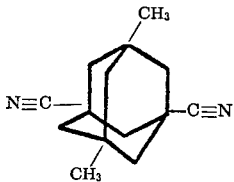

and is a white, crystalline solid useful in various applications.

CROSS REFERENCE TO RELATED APPLICATIONS

This invention is related to those described and claimed in applicant's applications Ser. Nos. 191,826, 191,833, 191,706, abandoned Nov. 20, 1972, and 191,700 all filed the same date as this application. The first of the aforementioned applications relates to the preparation of a dialkyladamantane diamine from a dialkyladamentane diacid; the second relates to a polyamide polymer derived, in part, from a dialkyladamantane diamine; the third to a novel polyimide polymer prepared from a dialkyladamantane diamine, and the fourth to a method for preparing a water white polyimide polymer from a dialkyladamantane diamine.

SUMMARY OF THE INVENTION

This invention pertains to the preparation of a dialkyladamantane dinitrile from a dialkyladamantane diacid; said nitrile having utility in synthetic fibers and in plastics and as a chemical intermediate. The process involves the contacting of a certain dialkyladamantane diacid with a chlorinating agent, and thereafter converting the resulting acid chloride to a diamide and thereafter contacting the diamide with a dehydrating agent to form the desired dinitrile. The invention also pertains to dialkyladamantane dinitriles; and more particularly, 1,3-dimethyladamantane-5,7-dinitrile having utility as an agricultural chemical.

DESCRIPTION OF THE INVENTION

The process is illustrated by the following equations:

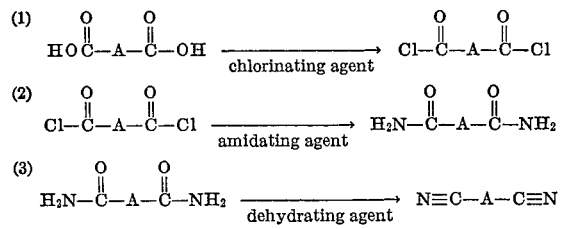

wherein A represents

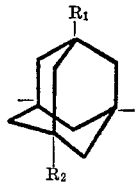

and each of $R_1$ and $R_2$ is an alkyl radical having 1–10 carbon atoms.

Preparation of a dialkyladamantane diacid, which is shown as the reactant in the aforementioned Equation 1, and in particular, 1,3-dimethyladamantane - 5,7 - dicarboxylic acid, is described in U.S. Pat. 3,356,719, issued Dec. 5, 1967, A. Schneider et al.

The reactant dialkyladamantane diacid can be only one such diacid; for example, 1,3-dimethyladamantane-5,7-dicarboxylic acid, 1-methyl,3 - ethyladamantane - 5,7-dicarboxylic acid, 1 pentyl-3-hexyladamantane, 5,7-dicarboxylic acid, etc., or a mixture of such acids; for example, 1,3-dimethyladamantane-5,7-dicarboxylic acid and 1-methyl, 3-ethyladamantane-5,7-dicarboxylic acid, and the like.

Initially a dialkyladamantane diacid is contacted with a suitable chlorinating agent; see aforementioned Equation 1. Examples of such agents are $SOCl_2$, $POCl_3$ and $PCl_5$; these are preferred. $SOCl_2$ is particularly useful since its reaction products; i.e., $SO_2$ and HCl are gaseous, thereby facilitating their removal from the solid acid chloride and any unreacted diacid. Also, $SOCl_2$, as a chlorinating agent, has the advantage of having a boiling point of about 80° C. This low boiling point permits any excess $SOCl_2$ to be removed efficiently by heating the reaction mixture with steam.

The mole ratio of chlorinating agent to the dialkyladamantane diacid used in the first contacting step is not critical and can be as low as 0.01 or as high as 100. If an excess amount; i.e., an amount greater than that estimated necessary by stoichiometric calculations to react with all the diacid, of chlorinating agent is used, than the excess remaining after the chlorination reaction can be removed. However, balancing increasing the yield after chlorination versus reducing the amount of excess agent to be removed, a more convenient ratio of agent to diacid is 0.1 to 10 and preferably, 0.9 to 5. Thus the amount of chlorinating agent used to contact the diacid should be sufficient to convert most, preferably all of the diacid to the corresponding acid chloride.

The temperature at which the dialkyladamantane diacid contacts the chlorinating agent can be between 0° C. and the decomposition temperature of the diacid. A temperature range of about 40° C.–140° C. is preferred with 60° C.–130° C. most preferred.

The time required for converting the diacid to the acid chloride depends on such variables as the temperature of contacting, the amount of mixing, if any, and the quantity of diacid being treated.

The acid chloride resulting from the contacting of the diacid and chlorinating agent before further processing, can be separated, and if necessary, purified further to remove any undesired by-products or unreacted diacid.

The next step of the present invention is the amidation of the acid chloride; i.e., the aforementioned Equation 2. Two methods, described hereinafter, are workable. One method employs the use of a solvent and $NH_3$; the other uses $NH_4OH$.

The solvent method is as follows. The resulting acid chloride, with or without prior purification is dissolved in a suitable solvent. A suitable solvent is one which does not substantially react with the acid chloride or the amidating agent; an unsatisfactory solvent is one containing an —OH (hydroxyl) group, e.g. water or alcohol. Suitable solvents include ethers and aromatic solvents such as benzene or toluene. The lower boiling solvents are particularly useful since they can be easily removed by evaporation at lower temperatures. A sufficient quantity of solvent to dissolve substantially all the acid chloride is generally employed.

After the aforementioned solution is formed, it is contacted with $NH_3$. The contacting can be performed several ways, e.g. bubbling $NH_3$ through the solution. However, because the formation of the diamide is exothermic, heat removal is required. Thus, while the amidating step can be conducted at 0° C.–50° C.; 0° C.–30° C. is preferred and in particular, 0° C.–20° C.

The time required for converting the acid chloride to the diamide depends on such variables as the rate at which the $NH_3$ contacts the mixture and the quantity of mixture being treated.

An alternative amidating step employs ammonium hydroxide; concentrated $NH_4OH$ is preferred. The acid chloride contacts the $NH_4OH$. The resulting $NH_4Cl$ remains dissolved in the water whereas the diamide, which is insoluble, precipitates out.

In either of the aforementioned amidations, the mole ratio of amidating agent to dichloride used in either of the amidations is not critical and can be as low as 0.01 or as high as 100. If an excess amount; i.e., an amount greater than that estimated necessary by stoichiometric calculations to react with all the dichloride is used, then the excess remaining after the amidation can be removed. However, balancing increasing the yield after amidation versus reducing the amount of excess agent to be removed, a more convenient mole ratio of agent to diacid is 0.1 to 10.0 and preferably, 0.9 to 5.0. Thus in either of the amidations, the amount of amidating agent used to contact the dichloride should be sufficient to convert most, preferably all of the dichloride to the corresponding diamide.

The resulting diamide can be treated by known methods to remove any unreacted acid chloride, and/or unwanted by-products and/or to neutralize any $NH_3$ or $NH_4OH$ remaining with the diamide.

As refererred to in the aforementioned Equation 3, the diamide is then contacted with a suitable dehydrating agent. Some examples of such agents are $SOCl_2$, $P_2O_5$, $POCl_3$, $PCl_5 \cdot NH_4OSO_2NH_2$ and $C_6H_4(CO)_2O$; these are preferred. Normally, the diamide is dissolved in a suitable aromatic solvent such as benzene or toluene. Lower boiling solvents are particularly useful because of their ease of evaporation. To the resulting solution sufficient dehydrating agent is added to convert the diamide to the dinitrile. $SOCl_2$ as a dehydrating agent is particularly useful since it forms gaseous $SO_2$ and $HCl$, both of which are evolved from the mixture.

The mole ratio of dehydrating agent to diamide used is not critical and can range from as low as 0.01 to as high as 100.0. If an excess amount, i.e., an amount greater than that estimated necessary by stoichiometric calculations to react with all the diamide is used, then the excess remaining after the dehydration can be removed. However, balancing increasing the yield after dehydration versus reducing the amount of excess agent to be removed, a more convenient mole ratio of agent to diamide is 0.1 to 10.0 and preferably, 0.9 to 5.0. Thus the amount of dehydrating agent used to contact the diamide should be sufficient to convert most, preferably all of the diamide to the corresponding dinitrile.

The temperature at which the diamide is contacted by a suitable dehydrating agent is between 0° C. and the decomposition temperature of the diamide. A temperature range of about 40° C.–150° C. is preferred; a range of about 60° C.–130° C. is most preferred.

The time required for converting substantially all the diamide to the dinitrile depends on such variables as the temperature of contacting and the quantity of diamide being converted.

After sufficient time has lapsed to convert the diamide to the dinitrile, the desired dinitrile can be separated from the reaction mixture. This separation can be achieved in numerous ways. If excess dehydrating agent is used, this can be neutralized by a suitable reactant. Thus, for example, if the dehydrating agent is $SOCl_2$, it can be neutralized with a dilute KOH solution. And, after separation of the water layer from the aromatic solvent, the dinitrile will crystallize out upon standing. An alternative is to evaporate the lower boiling solvent; this is particularly useful if no excess agent was used.

The resulting crystallized dinitrile can also be separated from the solvent by filtration or decanting. Then the dinitrile can be recrystallized from a suitable solvent, e.g. benzene-hexane solution, to remove any undesirable coproducts or unreacted starting material.

In order to further illustrate the invention, the following example is given.

EXAMPLE

Thirty grams of liquid $SOCl_2$ and 22.8 grams of solid 1,3 - dimethyladamantane - 5,7-dicarboxylic acid were placed in a suitable glass container and the mixture was refluxed for about 16 hours on a steam bath. After this refluxing the excess $SOCl_2$ in the reaction mixture was removed by distillation at lower than atmospheric pressure.

The resulting acid chloride was then dissolved in 300 milliliters of ether. Through this ether solution, maintained at 0° C., ammonia was bubbled for about two hours. Afterwards, the mixture was heated on a steam bath to evaporate the ether solvent.

The resulting diamide was then stirred into a glass container containing some dilute aqueous KOH. The diamide was filtered from the KOH solution, washed with water and then dried for about 16 hours at 80° C. under a vacuum. This washing procedure removed any undesired coproducts. The melting point of the diamide was 246° C.–251° C., the yield was 20 grams.

The 20 grams of the aforementioned diamide and 30 grams of $SOCl_2$ were placed in a glass container containing 125 milliliters of benzene. The resulting mixture was refluxed for about 16 hours. After the refluxing, the mixture was poured into a container with ice. To the ice mixture sufficient dilute KOH solution was added to obtain a pH of 7. The benzene layer, containing most of the dinitrile, was removed from the water layer. The latter was washed twice with benzene and the benzene washings were combined with the benzene layer. The composite benzene mixture was mixed with a drying agent; i.e., magnesium sulfate and then the sulfate was filtered from the benzene. This removed any water remaining in the benzene. The benzene was allowed to stand for about 16 hours. During this standing the dinitrile crystallized out of the benzene. The solid was filtered from the benzene.

The removed, filtered dinitrile was then added to a container holding warm, benzene-hexane mixture. Upon standing, the dinitrile crystallized out of the cooled mixture. The dinitrile was filtered out and dried. Fifteen grams of the dinitrile were obtained. The melting point of the white solid dinitrile was 131°–134° C.

The resulting 1,3-dimethyladamantane-5,7-dinitrile has utility as a herbicide and an insecticide.

Other dialkyladamantane diacids such as 1-methyl,3-ethyladamantane - 5,7 - dicarboxylic acid, 1,3 - diethyladamantane-5,7-dicarboxylic acid, etc., up to and including 1-3-didecyladamantane - 5,7 - dicarboxylic acid can be converted into corresponding dinitriles by the aforementioned process.

The invention claimed is:
1. An dialkyladamantane dinitrile having the following structural formula:

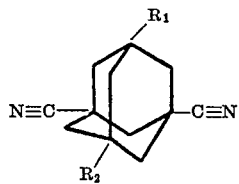

wherein each of $R_1$ and $R_2$ is an alkyl radical having 1–10 carbon atoms.

2. An dialkyladamantane dinitrile according to claim 1 wherein each of $R_1$ and $R_2$ is a methyl radical.

References Cited
UNITED STATES PATENTS

| | | | |
|---|---|---|---|
| 2,389,217 | 11/1945 | Surrey | 260—465.2 |
| 2,502,412 | 4/1950 | Ardis | 260—464 X |
| 3,342,880 | 9/1967 | Reinhardt | 260—464 X |
| 3,646,095 | 2/1972 | Moort | 260—464 X |

JOSEPH P. BRUST, Primary Examiner